United States Patent
Puls et al.

(10) Patent No.: US 11,200,086 B1
(45) Date of Patent: Dec. 14, 2021

(54) ASYNCHRONOUS TRANSACTIONS REPORTED AS CRITICAL PATH

(71) Applicant: New Relic, Inc., San Francisco, CA (US)

(72) Inventors: Ashley Emmons Puls, Portland, OR (US); Michael Hayes, Portland, OR (US); Howard G. Cunningham, Jr., Portland, OR (US); Kirby Frugia, Portland, OR (US); Gregory Eugene Unrein, Portland, OR (US); Etan Lightstone, Pacifica, CA (US)

(73) Assignee: NEW RELIC, INC., San Francisco, CA (US)

( * ) Notice: Subject to any disclaimer, the term of this patent is extended or adjusted under 35 U.S.C. 154(b) by 0 days.

(21) Appl. No.: 17/145,166

(22) Filed: Jan. 8, 2021

Related U.S. Application Data (63) Continuation of application No. 15/057,020, filed on Feb. 29, 2016, now abandoned.

(51) Int. Cl.
*G06F 9/44* (2018.01)
*G06F 9/46* (2006.01)
*G06F 11/36* (2006.01)
*H04L 29/08* (2006.01)

(52) U.S. Cl.
CPC .......... *G06F 9/466* (2013.01); *G06F 11/3688* (2013.01); *H04L 67/02* (2013.01)

(58) Field of Classification Search
CPC ....................................................... G06F 9/446
USPC ........................................................ 719/320
See application file for complete search history.

(56) References Cited

U.S. PATENT DOCUMENTS

| | | | |
|---|---|---|---|
| 2014/0122161 A1* | 5/2014 | Gupta | G06Q 10/06316 705/7.26 |
| 2014/0380282 A1* | 12/2014 | Sivalingam | G06F 11/3644 717/128 |
| 2016/0378615 A1* | 12/2016 | Cohen | G06F 11/3055 714/19 |

(Continued)

OTHER PUBLICATIONS

United States Office Action, U.S. Appl. No. 15/057,020, filed Jul. 13, 2020, 21 pages.

(Continued)

*Primary Examiner* — Timothy A Mudrick
(74) *Attorney, Agent, or Firm* — Fenwick & West LLP (57) ABSTRACT

An agent executed by a computer identifies a critical path of a transaction in a web application. The transaction includes a plurality of methods each representing an operation of the application and asynchronously executed by a server between a beginning of the transaction and an end of the transaction. The agent receives metrics for the transaction, which include identifiers of each executed method and specify relationships between the transaction methods. Based on the received metrics, the agent identifies a method completed at the end of the transaction. Based on the relationships between the methods, the agent determines one or more other methods preceding the identified method in the transaction and affecting a duration of the transaction. The determined methods and the method completed at the end of the transaction are identified as a critical path. Identifiers of the methods on the critical path are sent for display to a user.

19 Claims, 5 Drawing Sheets

(56) References Cited

U.S. PATENT DOCUMENTS

2017/0236082 A1* 8/2017 Davidson ........... G06Q 30/0635
　　　　　　　　　　　　　　　　　　　　705/7.25
2017/0237799 A1* 8/2017 Veeravalli ............. H04L 67/025
　　　　　　　　　　　　　　　　　　　　709/224

OTHER PUBLICATIONS

United States Office Action, U.S. Appl. No. 15/057,020, filed Nov. 29, 2019, 16 pages.
United States Office Action, U.S. Appl. No. 15/057,020, filed Aug. 13, 2018, 15 pages.
United States Office Action, U.S. Appl. No. 15/057,020, filed Jan. 12, 2018, 14 pages.

* cited by examiner

ASYNCHRONOUS TRANSACTIONS REPORTED AS CRITICAL PATH

CROSS REFERENCE TO RELATED APPLICATIONS

This application is a continuation of U.S. application Ser. No. 15/057,020 filed Feb. 29, 2016, the contents of both of which are hereby incorporated by reference in their entirety.

BACKGROUND

This disclosure relates generally to monitoring web servers, and in particular to monitoring critical paths in asynchronous transactions executed by web servers.

Web-based and mobile applications are common tools for delivering content and services to user computing devices. These applications are typically executed by web servers, which provide content to the computing devices by receiving requests from the computing devices and sending responses to the computing devices. Historically, web servers have processed requests synchronously. That is, any steps performed by the server to process the request were performed sequentially, with one step not performed until after the previous step has been completed. To increase the speed at which web servers can respond to requests, web servers are beginning to execute transactions asynchronously, in which processing steps may overlap in time.

The performance of a web application is often quantified at least in part by the amount of time the web server takes to respond to a request received from a user computing device, since this duration affects the user's perception of the speed of the web application. To improve the performance of the application, developers often need to know the amount of time the server takes to perform each processing step necessary to respond to a request. However, determining the duration of a transaction is currently difficult. Relationships between processing steps in the transaction, such as methods calling other methods and methods blocking other methods from executing, are not always readily apparent in a web application. It is therefore currently difficult to identify particular processing steps that are slowing down a transaction.

SUMMARY

An agent running on a web server monitors an application provided by the web server. The web application is made up of one or more transactions, each of which include a series of application components executed by the web server to respond to a request. Each transaction has one or more methods each representing an operation of the web application, and the methods are asynchronously executed by the web server. To monitor the web application, the agent injects executable code into at least a subset of the methods that, when executed by the web server, cause the web server to send the agent metrics describing the methods. In one embodiment, the metrics include identifiers of each executed transaction method and specify relationships between the methods. For example, the metrics may specify parent methods that call child methods, or methods that block other methods from executing.

Based on the received metrics, the agent identifies a transaction method completed at an end of the transaction. One or more other methods preceding the identified method in the transaction and affecting a duration of the transaction are determined based on the relationships between the transaction methods. The agent identifies the determined transaction methods and the method completed at the end of the transaction as a critical path of the transaction. The agent sends identifiers of the transaction methods on the critical path for display to a user.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
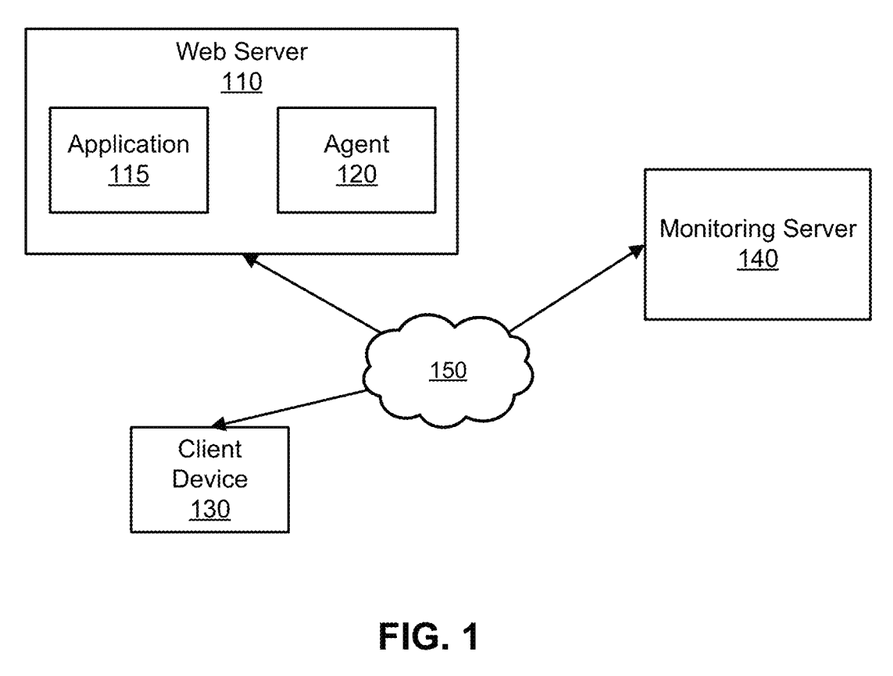
FIG. 1 illustrates a system environment for monitoring an application server, according to one embodiment.

FIG. 1 illustrates a system environment for monitoring a web server, according to one embodiment. In one embodiment, the environment includes the web server 110, a client device 130, and a monitoring server 140 communicating over a network 150.

The client device 130 includes one or more computing devices capable of receiving user input as well as transmitting and/or receiving data via the network 150. In one embodiment, a client device 130 is a conventional computer system, such as a desktop or laptop computer. Alternatively, a client device 130 may be a device having computer functionality, such as a personal digital assistant (PDA), a mobile telephone, a smartphone or another suitable device. A client device 130 is configured to communicate via the network 150. In one embodiment, a client device 130 executes an application allowing a user of the client device 130 to interact with the web server 110. For example, a client device 110 executes a browser application to enable interaction between the client device 130 and the web server 110 via the network 150. In another embodiment, a client device 130 interacts with the web server 110 through an application programming interface (API) running on a native operating system of the client device 110, such as IOS® or ANDROID™. Although a single client device 130 is shown in FIG. 1, any number of client devices 130 may interact with the web server 110 via the network 150.

The client device 130 is configured to communicate with the web server 110 via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The web server 110 operates an application 115 and an agent 120. The application 115 may be any of a variety of types of mobile applications or web applications, and may represent a subset of operations of a client-server application. The application 115 operated by the web server 110 includes any server-side processes of a client-server application, such as retrieving and storing database content, generating user interfaces for rendering at the client device 130, performing functions requested at the client device 130, and communicating content to the client device 130 (e.g., over the network 150), while the client-side processes of the application include processes such as displaying content to a user and communicating requests to the web server 110. For example, the web server 110 serves a web page to a client device 110 for display to a user. Although a single web server 110 is shown in FIG. 1, the web server 110 may comprise one or more computing devices executing the functions of the application 115, and the environment may include any number of web servers 110 operating any number of applications 115.

In one embodiment, the functionality of the application 115 is quantized into one or more transactions. Each transaction is a series of application components executed by the web server 110 to respond to a request received from a client device 130. In one embodiment, a start of a transaction is defined as a time the web server 110 receives a request from a client device 130 (e.g., a request to send a portion of a webpage for display at the client device 130), while an end of the transaction is defined as a time the web server 110 returns a response to the request (e.g., sends the webpage to the client device 130). The end of the transaction may be a time the web server 110 begins sending the response, a time the web server 110 finishes sending the response, or otherwise defined relative to the response. In another embodiment, the start and end of the transaction are specified points within the application 115 and not necessarily defined relative to a request and response.

Each component of the transaction is executed by one or more threads of execution maintained by the web server 110. Within each component, the web server 110 executes one or more methods. A transaction method represents a group of software statements or commands that together represent a discrete operation of the application 115. For example, one transaction method of the application 115 may be a database query, while another transaction method performs a calculation using the data retrieved from the database. The web server 110 may execute the components asynchronously such that multiple methods may be executed simultaneously or during overlapping time periods. Some of the methods may also call or be called by other methods of the transaction. A first method that calls a second method of the transaction is referred to as a "parent" of the second method, while the second method is referred to as a "child" of the first method. As a child of the first method, the second method is not executed until after the first method calls the second method (e.g., after the first method has been completed), even if the first method is executed within a different thread than the second. Some methods may also block components of the transaction, such that the execution of the component is paused while the blocking method is executed. For example, a first transaction component includes a first and third method and a second transaction component includes a second method, where the first method calls the second method and the second method calls the third method. While the second method is executing, the first component is blocked: no methods are executed on the first thread while the second method is being executed. When execution of the second method is completed, the third method is executed on the first thread.

The agent 120 monitors performance of the application 115, including processes running on the web server 110, response time of the application 115, transactions in the application 115, the effect of backend processes on performance of the application 115 at user devices, and/or other information. The agent 120 is a set of software modules executed by the web server 110 along with the application 115, and monitors the application 115 by injecting code into the application 115. The injected code is executed by the web server 110 when selected methods of application 115 are executed. The methods monitored by the agent 120 may be manually selected by a developer of the application 115 or an administrator of the app server 110, or may be automatically selected by the agent 120. For example, the agent 120 may monitor every method of the application 115. When executed, the injected code generates metrics that specify for each monitored method an identifier of the method, a duration of the execution of the method, children and/or parents of the method, and whether the method blocks any other application components from executing. The agent 120 aggregates the metrics to determine which methods are called during a transaction, a number of times each method was called, and the total duration of each method when executed. The agent 120 may also determine an exclusive execution time of each method that has one or more children, which represents the amount of time the parent method executed without considering the execution time of the child methods or the amount of time the parent method was blocked while the child methods were executed.

The agent 120 uses the metrics to identify a critical path in each transaction of the application 115. The critical path includes one or more methods that directly affect the duration of the transaction: if the execution time of a method on the critical path increases, the duration of the transaction will increase, and if the execution time of a method on the critical path decreases, the duration of the transaction will decrease. The agent 120 may also determine other methods in the transaction that are not on the critical path but are relevant to other properties of the transaction, such as memory utilization. For example, the agent 120 identifies a database call that did not contribute to the total duration of the transaction, but used a large amount of memory of the web server 110.

The monitoring server 140 monitors performance of the web server 110. The monitoring server 140 may be hosted by an application monitoring service provider, and may monitor performance of any number of app servers. In one embodiment, the monitoring server 140 is hosted by New Relic, Inc. and executes NEW RELIC APM. To monitor the web server 110, the monitoring server 140 provides the agent 120 to the web server 110 and receives data from the agent 120. The monitoring server 140 receives reports from the agent 120 and formats data in the reports for analysis by an administrator of the web server 110, enabling the administrator to address any performance issues in the application 115. For example, the monitoring server 140 generates plots illustrating execution times of methods on a critical path in a transaction. Reporting the execution time of the methods on the critical path enables the administrator to identify methods with long execution times and determine methods to target for decreasing the transaction time.

Figure 2:
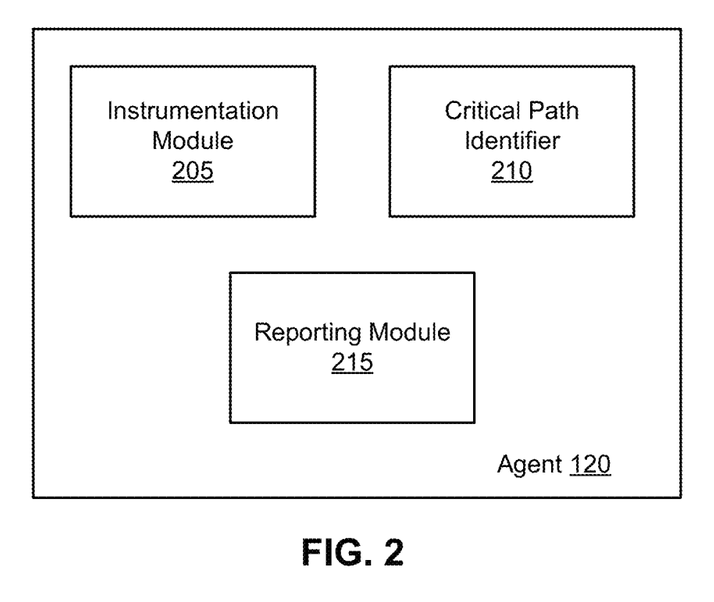
FIG. 2 is a block diagram illustrating modules within an agent, according to one embodiment.

FIG. 2 is a block diagram illustrating modules within the agent 120, according to one embodiment. As shown in FIG. 2, one embodiment of the agent 120 includes an instrumentation module 205, a critical path identifier 210, and a reporting module 215. Other embodiments of the agent 120 may include fewer, additional, or different modules, and the functionality may be distributed differently between the modules.

The instrumentation module 205 instruments the application 115 for monitoring by the agent 120. In one embodiment, to instrument the application 115, the instrumentation module 205 injects executable instructions into selected methods of the application 115. In one embodiment, the instrumentation module 205 injects the instructions into each method to be monitored at the start and end of the method and at any references to other methods contained within the method. For example, the instrumentation module 205 injects instructions at a call to another method, a database call, or a blocking call. When the instrumented methods are executed by the web server 110, the code injected by the instrumentation module 205 is also executed. The executed instructions cause the web server 110 to generate the metrics of the transaction.

The critical path identifier 210 receives the metrics from the application 115 and determines a critical path of each transaction associated with the application. To identify the critical path, the critical path identifier 210 traces backwards through the metrics of an executed transaction from an end of the transaction to the start of the transaction. For each method in the transaction, starting with the method at the end (e.g., the method returning a response to the client device 130), the critical path identifier 210 determines either a blocking method call within the method or a beginning of the method. If the method includes a blocking call, the critical path identifier 210 determines an earlier method in the transaction that is performing the blocking call. If the critical path identifier 210 reaches a beginning of the method, the critical path identifier 210 identifies an earlier method in the transaction that called the method. The critical path identifier 210 sequentially steps backward through the methods of the transaction in this manner until a start of the transaction is reached. Any methods hit while stepping backward through the transaction are identified as forming the critical path. A process for identifying a critical path is described further with respect to FIG. 3.

Figure 3:
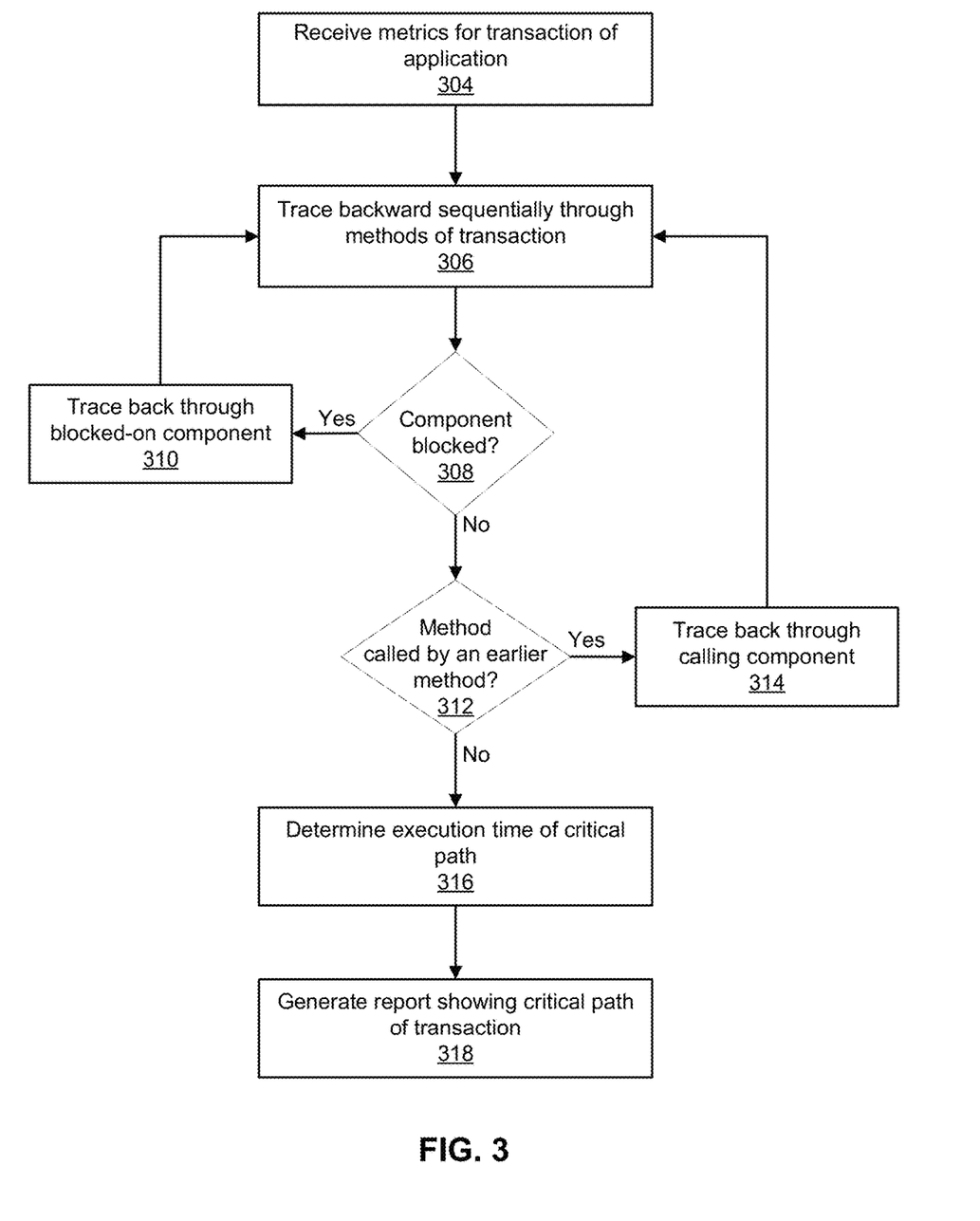
FIG. 3 is a flowchart illustrating a process for identifying a critical transaction path, according to one embodiment.

The reporting module 215 generates reports associated with the application 115 for display to a developer of the application 115 or an administrator of the web server 110. The reports generated by the reporting module 215 provide information about the critical path of each transaction, including an identifier of each transaction method in the critical path. The reporting module 215 may also determine and report an execution time of each transaction method in the critical path. The reported execution time may be the time for the web server 110 to execute a given transaction method once, or may be an average or sum of the execution times of the method over several transactions FIG. 3 illustrates a process for identifying a critical path of a transaction associated with the application 115, according to one embodiment. In one embodiment, the steps of the process shown in FIG. 3 are performed by the agent 120. In other embodiments, the steps may be performed in different orders, and the process may include different, additional, or fewer steps. The process in FIG. 3 is described with respect to the example transaction shown in FIGS. 4A-D.

Figure 4A:
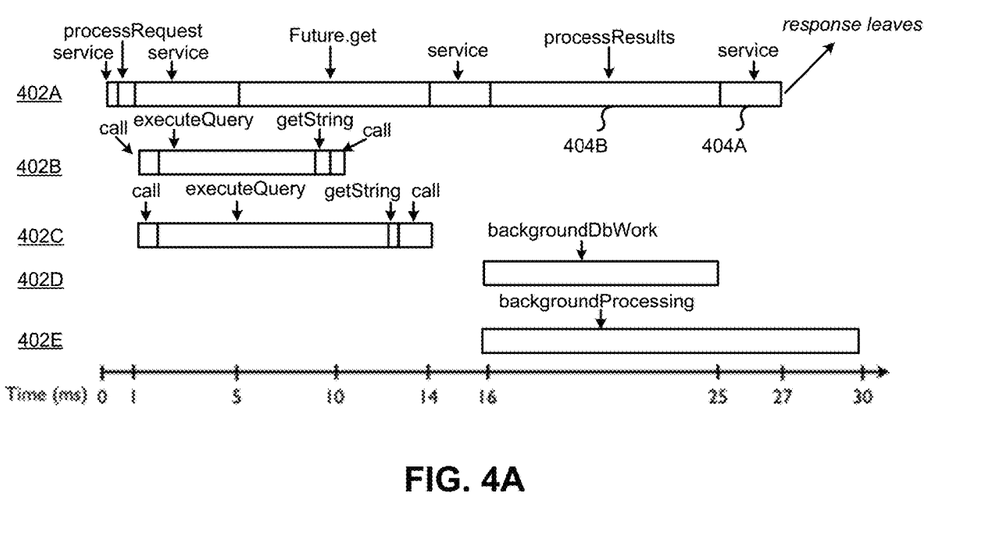
FIGS. 4A-4D illustrate an example transaction in an application, according to one embodiment.

The agent 120 receives 304 metrics for a transaction within the application 115. The metrics identify methods called during the transaction and relationships between the methods of the transaction. For example, the metrics specify child and parent relationships between the methods and identify any methods that block other methods in the transaction. The metrics may also include the amount of time the web server 110 took to execute each method or a start time of each method, from which the agent 120 can calculate the execution time of each method. In one embodiment, the agent 120 receives the metrics by inserting instructions into the application 115 that, when executed by the server 110, cause the server 110 to send the agent 120 information about the instrumented methods. An example representation of the metrics for a transaction are shown in FIG. 4A. In FIG. 4A, each block represents a method of the application 115 being executed by the web server 110 over an interval of time. For example, block 404B represents a method "processResults," which is executed by the web server over a 9 millisecond interval beginning at 16 ms after a request was received. The example transaction includes five application components 402A-E, which each includes one or more methods executed by the web server 110.

Figure 4B:
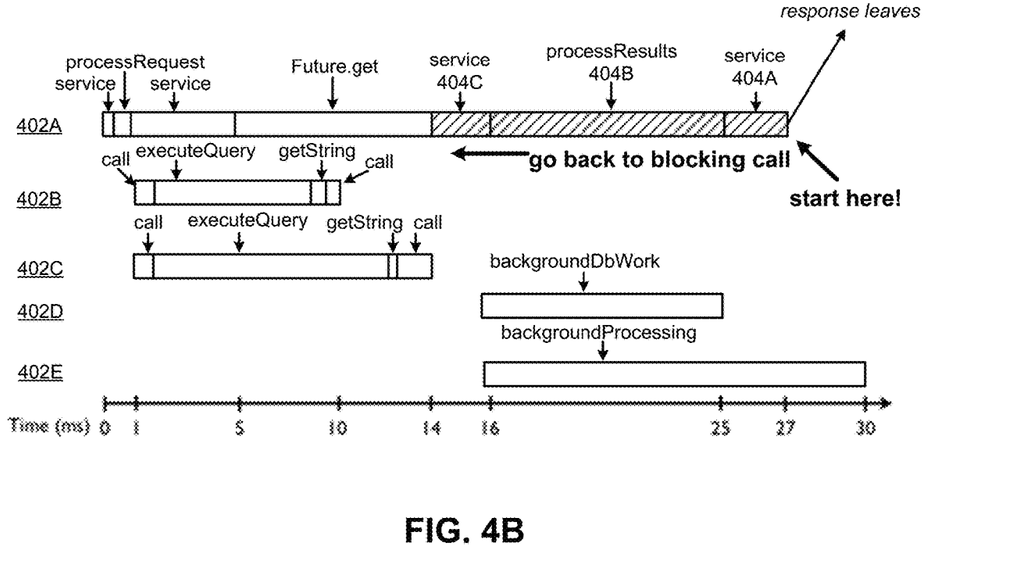

Starting with the transaction component including the last method executed by the web server 110 during the transaction, the agent 120 traces 306 backward through the methods of the transaction. FIG. 4B illustrates an example of tracing backward through the transaction, starting at an end of a method 404A returning a response to a client device 110 and tracking through the method 404A as well as the methods 404B and 404C on the first component 402A. At the beginning of each method, the agent 120 uses the metrics to determine whether the component was blocked by another method or whether the method was called by an earlier method.

Figure 4C:
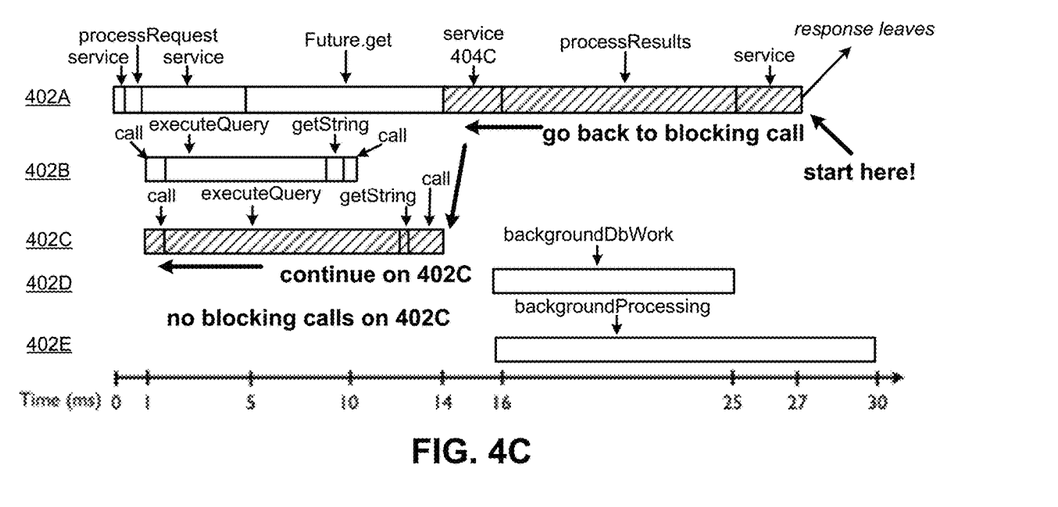
Figure 4D:
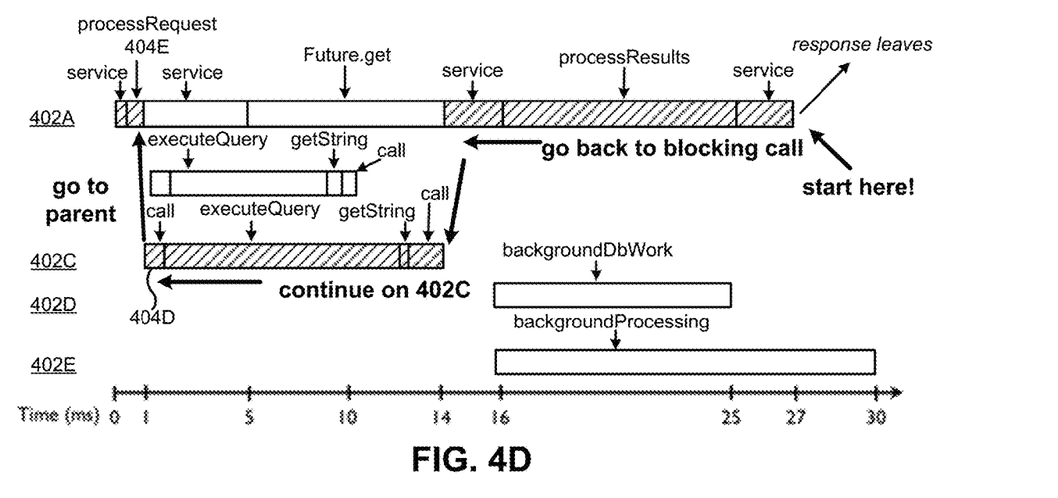

If the agent 120 determines 308 (FIG. 3) that the component was blocked by an earlier method, the agent 120 traces back 310 through the blocked-on component. FIG. 4C illustrates an example in which the first component 402A was blocked from executing by the third component 402C. For example, since the third component 402C includes methods that generate data necessary for continued processing on the first component 402A, the web server 110 must execute the third component fully before processing on the first component can continue. In the example of FIG. 4C, the agent 120 identifies that the first component 402A was blocked, and that the method 404C was called by the third component 402C. The agent 120 therefore continues tracing backward through the methods of the third component 402C, as shown in FIG. 4C.

If the agent 120 determines the component was not blocked but instead determines 312 that a method was called by an earlier method in the transaction, the agent 120 traces back 314 through the component including the calling method. For example, in FIG. 4D, a method 404D at the beginning of the third component 402C is called by a method 404E in the first component 402A. Thus, once the agent 120 reaches the beginning of the method 404D, the agent 120 continues tracing back through methods of the first component 404E.

When the agent 120 reaches the beginning of the transaction (e.g., when the current component is not blocked and the earliest method in the component is not called by another method), the agent 120 determines 316 execution times of the methods on the critical path. The critical path includes any methods identified while tracing backward through the methods of the transaction. Using the start times of each method in the critical path as specified by the metrics, the agent 120 computes an amount of time the web server 110 took to execute each method. In one embodiment, the agent 120 determines execution times of the methods for one iteration of the transaction. In another embodiment, the agent 120 determines a number of times the transaction was executed over a given period of time (e.g., one day) and an aggregate execution time of the methods on the critical path. For example, the agent 120 may compute a mean execution time for each method over the given time period or total execution time of each method during the time period. The agent 120 may also use the execution times of the methods on the critical path to determine an overall execution time of the transaction. For example, the agent 120 may compute a sum of the execution times of the methods during one iteration of the transaction, or may compute a sum of the mean execution times of the methods.

Figure 5A:
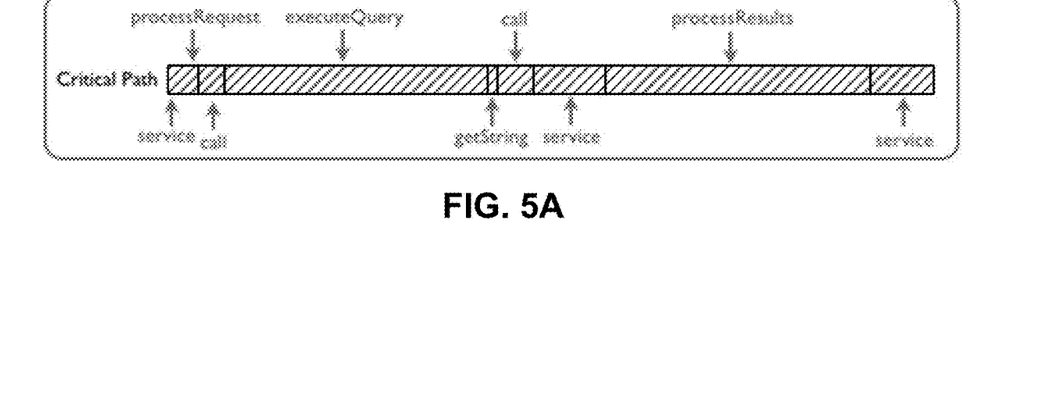
FIGS. 5A-5B illustrate example reports illustrating a critical transaction path, according to one embodiment.
Figure 5B:
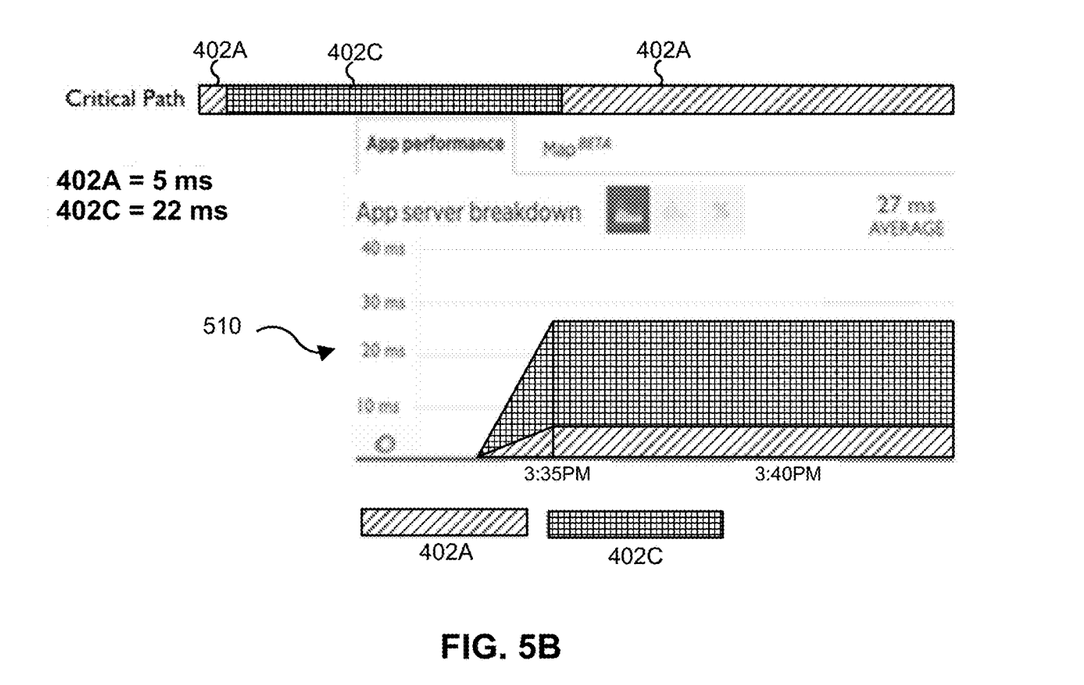

The agent 120 generates 318 a report based on the critical path of the transaction. In one embodiment, the report illustrates the critical path of the transaction and execution times of the methods on the critical path. FIG. 5A is an example report that may be generated by the agent 120, which illustrates the critical path identified for the example transaction shown in FIGS. 4A-D. In another embodiment, the report illustrates execution times of the methods on the critical path over time. For example, FIG. 5B illustrates a report generated for a transaction that has a critical path of methods 402A and 402C. The example report in FIG. 5B includes a graph 510 showing how each method on the critical path contributes to the total transaction response time over an interval of time.

The reports generated by the agent 120 may be sent to a developer of the application 115 or an administrator of the web server 110, who can use the reported information to analyze the performance of the application 115. For example, a developer can use the report to decrease the execution time of the transactions by identifying methods that are significantly increasing the execution time and modifying those methods to execute more quickly. The developer can also use the critical path to verify that methods were executed in the intended order and at the correct time.

For example, a developer uses the report shown in FIG. 5B to observe that a particular transaction has a critical path including methods 402A and 402C. The developer also observes that the duration of the transaction increased significantly around 3:35 PM, to approximately 27 ms per execution of the transaction. At the time the duration of the transaction increased, the report shows that transaction method 402C required approximately 22 ms on average to execute while transaction 402A is executed in approximately 5 ms. Because the duration of method 402C constitutes a large percentage of the total transaction time, the developer observes that decreasing the execution time of the method 402C will likely have a large effect on the total execution time of the transaction. The developer may then modify the method 402C to execute more quickly (e.g., in 11 ms), reducing the total average time of the transaction from 27 ms to 16 ms. Thus, the report generated by the agent 120 quickly identifies to the developer the transaction methods that most influence the duration of a transaction. By reducing the execution time of the specific method contributing the most to the transaction duration (and not, for example, spending time improving the execution time of methods that are relatively slow but not on the critical path), the developer quickly and easily increases the apparent responsiveness and performance of the application 115 at the client devices 110.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method for identifying a critical path for a previously executed transaction of a web application comprising:

for a plurality of transaction methods representing completed operations of the transaction from a beginning of the transaction to an end of the transaction, wherein:
at least one transaction method was asynchronously executed by the web application,
one of the transaction methods transmitted a response at the end of the transaction, and
each of the plurality of transaction methods comprises metrics that describe its operation during execution of the transaction, the metrics including:
an identifier for the transaction method, and
a relationship describing a sequentially called and a sequentially executed transaction method of the plurality of transaction methods of the transaction;
receiving the metrics for each of the plurality of transaction methods;
identifying the transaction method that transmitted the response at the end of the transaction as a last transaction method;
determining one or more preceding transaction methods of the plurality of transaction methods by tracing relationships backwards from the last transaction method at the end of the transaction to the beginning of the transaction, the preceding transaction methods including the transaction methods of the plurality of transaction methods that sequentially call and sequentially precede the last transaction method from the end of the transaction to the beginning of the transaction;
identifying the last transaction method and the one or more preceding transaction methods as a critical path of the transaction; and
sending the metrics of the transaction methods on the critical path for display to a user.

2. The method of claim 1, wherein the transaction comprises a plurality of execution threads each including one or more of the plurality of transaction methods.

3. The method of claim 2, wherein determining the one or more preceding transaction methods comprises:
for a transaction method on the critical path executing on an execution thread of the plurality of execution threads:
identifying a beginning of the transaction method based on the metrics for the transaction method on the critical path; and
responsive to identifying the beginning of the transaction method, determining an other transaction method on the execution thread as the preceding transaction method that sequentially calls and sequentially precedes the transaction method on the critical path.

4. The method of claim 2, wherein determining the one or more preceding transaction methods comprises:
for a transaction method on the critical path executing on an execution thread of the plurality of execution threads:
identifying, based on the metrics for the transaction method on the critical path, a sequential relationship between an other transaction method on an other execution thread of the plurality of execution threads;
responsive to identifying the sequential relationship, determine the other transaction method on the other execution thread as the preceding transaction method that sequentially calls and sequentially precedes the transaction method on the critical path.

5. The method of claim 4, wherein the sequential relationship between the transaction method on the critical path and the other transaction method on the other execution thread comprises the other transaction method blocking the thread of execution including the transaction method.

6. The method of claim 1, wherein the beginning of the transaction corresponds to a time a server executing the web application received a request associated with the web application, and wherein the end of the transaction corresponds to a time the server transmitted a response to the request.

7. The method of claim 1, wherein the metrics further include start times of each transaction method, and wherein the method further comprises:
determining an execution time of each transaction method on the critical path based on the start times.

8. The method of claim 7, wherein sending the metrics of the transaction methods on the critical path for display to the user further comprises:
generating a report for display to the user including identifiers for the transaction methods on the critical path and the execution times of the transaction methods on the critical path.

9. The method of claim 7, further comprising:
calculating a mean execution time of each transaction method on the critical path over a plurality of iterations of the transaction; and
generating a report for display to the user including the identifiers for the transaction methods on the critical path and the mean execution times.

10. A non-transitory computer readable storage medium storing executable computer program instructions for identifying a critical path for a previously executed transaction of a web application, the instructions when executed by a processor causing the processor to:
for a plurality of transaction methods representing completed operations of the transaction from a beginning of the transaction to an end of the transaction, wherein:
at least one transaction method was asynchronously executed by the web application,
one of the transaction methods transmitted a response at the end of the transaction, and
each of the plurality of transaction methods comprises metrics that describe its operation during execution of the transaction, the metrics including:
an identifier for the transaction method, and
a relationship describing a sequentially called and a sequentially executed transaction method of the plurality of transaction methods of the transaction;
receiving the metrics for each of the plurality of transaction methods;
identifying the transaction method that transmitted the response at the end of the transaction as a last transaction method;
determining one or more preceding transaction methods of the plurality of transaction methods by tracing relationships backwards from the last transaction method at the end of the transaction to the beginning of the transaction, the preceding transaction methods including the transaction methods of the plurality of transaction methods that sequentially call and sequentially precede the last transaction method from the end of the transaction to the beginning of the transaction;
identifying the last transaction method and the one or more preceding transaction methods as a critical path of the transaction; and
sending the metrics of the transaction methods on the critical path for display to a user.

11. The non-transitory computer readable storage medium of claim 10, wherein the transaction comprises a plurality of execution threads each including one or more of the plurality of transaction methods.

12. The non-transitory computer readable storage medium of claim 11, wherein determining the one or more preceding transaction methods further causes the processor to:
for a transaction method on the critical path executing on an execution thread of the plurality of execution threads:
identify a beginning of the transaction method based on the metrics for the transaction method on the critical path; and
responsive to identifying the beginning of the transaction method, determine an other transaction method on the execution thread as the preceding transaction method that sequentially calls and sequentially precedes the transaction method on the critical path.

13. The non-transitory computer readable storage medium of claim 11, wherein determining the one or more preceding transaction methods further causes the processor to:
for a transaction method on the critical path executing on an execution thread of the plurality of execution threads:
identify, based on the metrics for the transaction method on the critical path, a sequential relationship between an other transaction method on an other execution thread of the plurality of execution threads;
responsive to identifying the sequential relationship, determine the other transaction method on the other execution thread as the preceding transaction method that sequentially calls and sequentially precedes the transaction method on the critical path.

14. The non-transitory computer readable storage medium of claim 13, wherein the sequential relationship between the transaction method on the critical path and the other transaction method on the other execution thread comprises the other transaction method blocking the thread of execution including the transaction method.

15. The non-transitory computer readable storage medium of claim 10, wherein the beginning of the transaction corresponds to a time a server executing the web application received a request associated with the web application, and wherein the end of the transaction corresponds to a time the server transmitted a response to the request.

16. The non-transitory computer readable storage medium of claim 10, wherein the metrics further include start times of each transaction method, and wherein the instructions, when executed, further cause the processor to:
determine an execution time of each transaction method on the critical path based on the start times.

17. The non-transitory computer readable storage medium of claim 16, wherein sending the metrics of the transaction methods on the critical path for display to the user further causes the processor to:
generate a report for display to the user including identifiers for the transaction methods on the critical path and the execution times of the transaction methods on the critical path.

18. The non-transitory computer readable storage medium of claim 16, wherein the instructions, when executed, further cause the processor to:
calculating a mean execution time of each transaction method on the critical path over a plurality of iterations of the transaction; and
generating a report for display to the user including the identifiers for the transaction methods on the critical path and the mean execution times.

19. A system comprising:
one or more processors; and
one or more non-transitory computer readable storage mediums storing computer program instructions for identifying a critical path for a previously executed transaction of a web application, the instructions when executed by the one or more processors causing the one or more processors to perform steps including:
for a plurality of transaction methods representing completed operations of the transaction from a beginning of the transaction to an end of the transaction, wherein:
at least one transaction method was asynchronously executed by the web application,
one of the transaction methods transmitted a response at the end of the transaction, and
each of the plurality of transaction methods comprises metrics that describe its operation during execution of the transaction, the metrics including:
an identifier for the transaction method, and
a relationship describing a sequentially called and a sequentially executed transaction method of the plurality of transaction methods of the transaction;
receiving the metrics for each of the plurality of transaction methods;
identifying the transaction method that transmitted the response at the end of the transaction as a last transaction method;
determining one or more preceding transaction methods of the plurality of transaction methods by tracing relationships backwards from the last transaction method at the end of the transaction to the beginning of the transaction, the preceding transaction methods including the transaction methods of the plurality of transaction methods that sequentially call and sequentially precede the last transaction method from the end of the transaction to the beginning of the transaction;
identifying the last transaction method and the one or more preceding transaction methods as a critical path of the transaction; and
sending the metrics of the transaction methods on the critical path for display to a user.

* * * * *